(12) United States Patent
Frosell et al.

(10) Patent No.: US 9,879,506 B2
(45) Date of Patent: Jan. 30, 2018

(54) TRANSVERSE FLOW DOWNHOLE POWER GENERATOR

(71) Applicant: Halliburton Energy Services, Inc., Houston, TX (US)

(72) Inventors: Thomas Jules Frosell, Irving, TX (US); Michael Linley Fripp, Carrollton, TX (US); Zachary Ryan Murphree, Dallas, TX (US); John Gano, Carrollton, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 109 days.

(21) Appl. No.: 14/759,962

(22) PCT Filed: Sep. 19, 2014

(86) PCT No.: PCT/US2014/056428
§ 371 (c)(1),
(2) Date: Jul. 9, 2015

(87) PCT Pub. No.: WO2016/043762
PCT Pub. Date: Mar. 24, 2016

(65) Prior Publication Data
US 2016/0265315 A1    Sep. 15, 2016

(51) Int. Cl.
*E21B 41/00* (2006.01)
*E21B 43/08* (2006.01)
(Continued)

(52) U.S. Cl.
CPC ........ *E21B 41/0085* (2013.01); *E21B 43/088* (2013.01); *H02K 1/27* (2013.01);
(Continued)

(58) Field of Classification Search
CPC ...... E21B 41/0085; E21B 34/06; E21B 43/08; E21B 43/12
See application file for complete search history.

(56) References Cited

U.S. PATENT DOCUMENTS

| 5,626,200 A | 5/1997 | Gilbert et al. |
| 6,672,409 B1 | 1/2004 | Dock et al. |

(Continued)

OTHER PUBLICATIONS

International Search Report and Written Opinion for PCT/US2014/056428 dated May 29, 2015.

*Primary Examiner* — Giovanna C Wright
*Assistant Examiner* — Brandon Duck
(74) *Attorney, Agent, or Firm* — McDermott Will & Emery LLP

(57) ABSTRACT

An example well system includes a base pipe having an interior and defining one or more flow ports, the base pipe being positionable within a wellbore adjacent a subterranean formation. A flow path for a fluid extends between the interior of the base pipe, through the one or more flow ports, and to an exterior of the base pipe. A transverse turbine is positioned in the flow path, the transverse turbine including a rotor and a plurality of blades positioned to receive a flow of the fluid perpendicular to a rotational axis of the rotor. A generator includes one or more magnets rotatable with rotation of the transverse turbine and one or more coil windings mounted on a stator. The flow of the fluid rotates the transverse turbine and rotation of the transverse turbine generates electrical power in the generator.

20 Claims, 4 Drawing Sheets

(51) Int. Cl.
*H02K 1/27* (2006.01)
*H02K 7/18* (2006.01)
*E21B 33/12* (2006.01)
*E21B 34/06* (2006.01)
*E21B 47/00* (2012.01)
*E21B 47/12* (2012.01)

(52) U.S. Cl.
CPC ............ *H02K 7/1823* (2013.01); *E21B 33/12* (2013.01); *E21B 34/066* (2013.01); *E21B 47/00* (2013.01); *E21B 47/12* (2013.01)

(56) References Cited

U.S. PATENT DOCUMENTS

| | | |
|---|---|---|
| 7,165,608 B2 | 1/2007 | Schultz et al. |
| 2005/0012340 A1* | 1/2005 | Cousins .................... H02P 6/15 290/52 |
| 2005/0017453 A1 | 1/2005 | Rehbein et al. |
| 2013/0051177 A1 | 2/2013 | Vecseri et al. |
| 2013/0220633 A1* | 8/2013 | Felten .................... E21B 43/08 166/373 |
| 2015/0260014 A1* | 9/2015 | Zimmerman ....... E21B 41/0085 166/373 |

* cited by examiner

TRANSVERSE FLOW DOWNHOLE POWER GENERATOR

BACKGROUND

The present disclosure relates to downhole power generation systems and, more particularly, to downhole power generation systems that use turbines to generate electrical power.

Hydrocarbon recovery wells used to extract hydrocarbons from one or more production zones underneath the earth's surface often require downhole power in order to operate components such as actuators and pressure and temperature sensors in the well. Current systems requiring downhole power include intelligent wells and permanent gauge installations where actuators are used to operate chokes and restrict fluid flow into the well at different levels for multiple zone production. In such systems, sensors are also often used to detect real-time parameters within the well. Such systems are often necessary for control of fluid pressure and flow from various production zones.

Electrical power is often provided downhole via an umbilical that is extended from a surface location to the downhole tools. A typical umbilical includes a protected electrical tethered line that is used to deliver both power and data to sensors and actuators associated with the downhole tools. In addition, wireless telemetry methods are useful for communicating or general interfacing with such components and as a means of facilitating data transmission between the surface operator and the downhole tools. Finally, batteries and battery packs can be used for short-term power applications.

While such downhole power systems are useful, they do not meet the long-term power needs of modern day production operations. For example, the practical difficulties related to the installation and maintenance of power umbilicals limits their long-term usefulness. Umbilical systems, for instance, can interfere with and obstruct the well, production tubing, and other downhole structures by restricting passage of tools and other components into the wellbore. The use of wireless telemetry with batteries has been contemplated, but such systems often suffer from an inability to provide useful levels of power or sustain power over long periods of time.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure relates to downhole power generation systems and, more particularly, to downhole power generation systems that use turbines to generate electrical power.

The embodiments described herein provide a transverse flow turbine assembly configured to generate electrical power in a downhole environment and provide the generated electrical power to adjacent downhole tools, components, or devices for consumption. Exemplary downhole tools, components, or devices that may benefit from the generated electrical power include, but are not limited to downhole sensors, telemetry devices, chokes, and valves. In operation, the transverse flow turbine assembly may receive a fluid flow circulating through a flow path and convert the kinetic energy exhibited by the fluid flow into rotational energy that can be used to generate electrical power in an adjacent power generator. The flow path and/or the fluid flow may result from production or injection operations undertaken within a downhole well system.

The transverse flow turbine assembly receives the fluid flow transversely, or perpendicular to its rotational axis. This may prove advantageous in facilitating alternative packaging options for downhole turbine generators, which would otherwise not fit in specific locations of downhole tools. For instance, the improved packaging options allow the transverse flow turbine assembly to be placed within the annulus of a screen assembly. The transverse flow turbine assembly may also provide increased power generation at a given flow rate as compared to axial flow turbine assemblies. The increased power generation allows the generator to supply power to more applications, such as wireless telemetry, valve or choke actuation, and sensing. Moreover, the smaller size of the transverse flow turbine assembly reduces its overall cost, which allows the transverse flow turbine assembly to be placed directly into completion assemblies.

Figure 1:
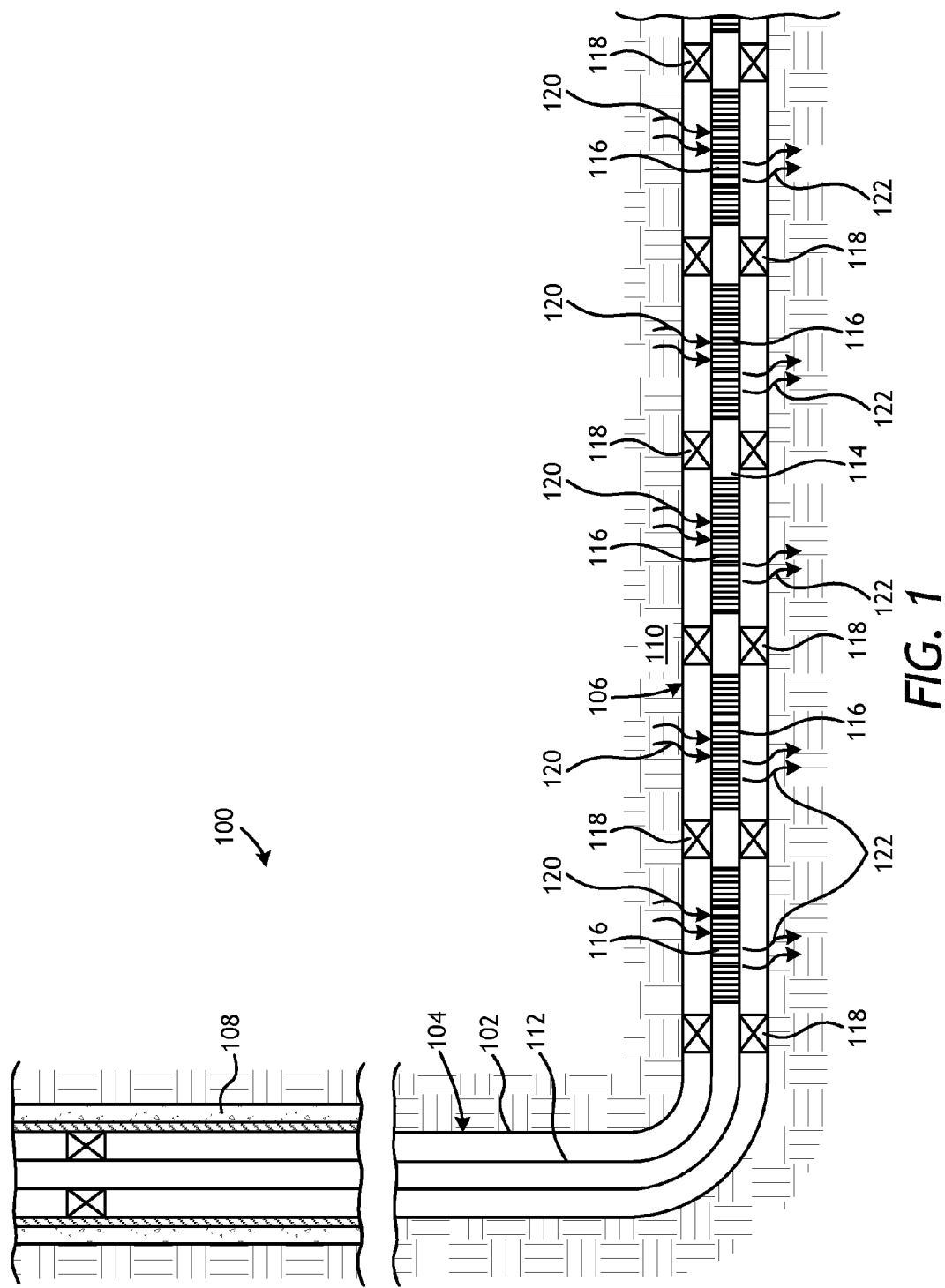
FIG. 1 is a schematic drawing of a well system that may employ the principles of the present disclosure.

Referring to FIG. 1, illustrated is a well system 100 that may employ one or more of the principles of the present disclosure, according to one or more embodiments of the disclosure. As depicted, the well system 100 includes a wellbore 102 that extends through various earth strata and has a substantially vertical section 104 that extends to a substantially horizontal section 106. The upper portion of the vertical section 104 may have a casing string 108 cemented therein, and the horizontal section 106 may extend through a hydrocarbon bearing subterranean formation 110. In at least one embodiment, the horizontal section 106 may be arranged within or otherwise extend through an open hole section of the wellbore 102. In other embodiments, however, the horizontal section 106 may also include casing 108 positioned therein, without departing from the scope of the disclosure.

A tubing string 112 may be positioned within the wellbore 102 and extend from the surface (not shown). The tubing string 112 may be any piping, tubular, or fluid conduit used in the oil and gas industry including, but not limited to, drill pipe, production tubing, casing, coiled tubing, and any combination thereof. The tubing string 112 provides a conduit for fluids extracted from the formation 110 to travel to the surface. In other embodiments, the tubing string 112 may provide a conduit for fluids to be conveyed downhole and injected into the formation 110, such as in an injection operation.

At its lower end, the tubing string 112 may be coupled to a completion string 114 arranged within the horizontal section 106. In other embodiments, the tubing and completion strings 112, 114 may be considered the same tubing. The completion string 114 divides the completion interval into various production intervals adjacent the formation 110. As used herein, the term "completion interval" refers to the area within the wellbore 102 where the completion string 114 is located and otherwise where various wellbore operations are to be undertaken using the well system 100, such as production or injection operations. As depicted, the completion string 114 may include a plurality of sand control screen assemblies 116 axially offset from each other along portions of the completion string 114. Each screen assembly 116 may be positioned between a pair of packers 118 that provides a fluid seal between the completion string 114 and the wellbore 102, thereby defining corresponding production intervals. In operation, the screen assemblies 116 serve the primary function of filtering particulate matter out of the production fluid stream such that particulates and other fines are not produced to the surface.

It should be noted that even though FIG. 1 depicts the screen assemblies 116 as being arranged in an open hole portion of the wellbore 102, embodiments are contemplated herein where one or more of the screen assemblies 116 is arranged within cased portions of the wellbore 102. Also, even though FIG. 1 depicts a single screen assembly 116 arranged in each production interval, any number of screen assemblies 116 may be deployed within a particular production interval without departing from the scope of the disclosure. In addition, even though FIG. 1 depicts multiple production intervals separated by the packers 118, the completion interval may include any number of production intervals with a corresponding number of packers 118 used therein. In other embodiments, the packers 118 may be entirely omitted from the completion interval, without departing from the scope of the disclosure.

While FIG. 1 depicts the screen assemblies 116 as being arranged in a generally horizontal section 106 of the wellbore 102, those skilled in the art will readily recognize that the screen assemblies 116 are equally well suited for use in wells having other directional configurations including vertical wells, deviated wellbores, slanted wells, multilateral wells, combinations thereof, and the like. The use of directional terms such as above, below, upper, lower, upward, downward, left, right, uphole, downhole and the like are used in relation to the illustrative embodiments as they are depicted in the figures, the upward or uphole direction being toward the surface of the well and the downward or downhole direction being toward the toe or bottom of the well.

The well system 100 may be used to undertake various wellbore operations. In some embodiments, for example, the well system 100 may be used to extract fluids 120 from the formation 110 and transport those fluids 120 to the surface via the tubing string 112. The fluids 120 may be a fluid composition originating from the surrounding formation 110 and may include one or more fluid components, such as oil, water, gas, oil and water, oil and gas, gas and water, gas and oil, carbon dioxide, cement, and the like. As illustrated, each screen assembly 116 may include one or more well screens (not labeled) arranged about the completion string 114 and may further include one or more flow control devices (not shown) used to regulate or restrict the flow of fluids 120 into the completion string 114, and thereby balance flow among the production zones and prevent water or gas coning.

In other embodiments, the well system 100 may be used to inject fluids 122 into the surrounding subterranean formation 110, such as in hydraulic fracturing operations, steam-assisted gravity drainage (SAGD) operations, wellbore treatment operations, gravel packing operations, acidizing operations, any combination thereof, and the like. Accordingly, the injected fluids 122 may be water, steam, gas, aqueous or liquid chemicals, a gravel slurry, acids, or any combination thereof.

In either production or injection operations, the well system 100 may require the use of various downhole tools, components, or devices including, but not limited to, downhole sensors, telemetry devices, chokes, and valves. The downhole sensors may be positioned along the completion interval and used to measure various wellbore properties, such as pressure, temperature, fluid flow properties, and other properties of the formation and the flowing fluid. The telemetry devices may be communicably coupled to the downhole sensors and otherwise able to communicate the detected wellbore parameters to a surface location. Exemplary telemetry devices include, but are not limited to, acoustic, electromagnetic, and pressure pulse telemetry devices. The chokes and valves may include actuatable flow regulation devices, such as variable chokes and valves, and may be used to regulate the flow of the fluids 120, 122 into and/or out of the completion string 114. To accomplish this, the chokes and valves may require power to be actuated or moved between open and closed positions. In some cases, the telemetry devices may be communicably coupled to the chokes and valves and otherwise configured to receive signals from a surface location and thereby operate the chokes and valves based on these signals.

The downhole sensors, telemetry devices, chokes, and valves described above, and various other downhole tools or devices known to those skilled in the art, require electrical power to operate. Given that a typical wellbore operation, such as production operations, may occur over the span of multiple years, it is often necessary to provide such electrical power for long periods of time. According to the present disclosure, electrical power may be generated downhole using a transverse flow turbine assembly, and the generated electrical power may be consumed by "loads" associated with the well system 100, such as the downhole sensors, telemetry devices, chokes, and valves. As described below, the transverse flow turbine assembly may be configured to receive a fluid flow circulating through a flow path and convert the kinetic energy provided by the fluid flow into rotational energy that can be used to generate electrical power in an adjacent generator. The flow path and/or the fluid flow may result from production or injection operations undertaken within the well system 100, thereby providing a motive force to power electronics for the life of the well.

Figure 2:
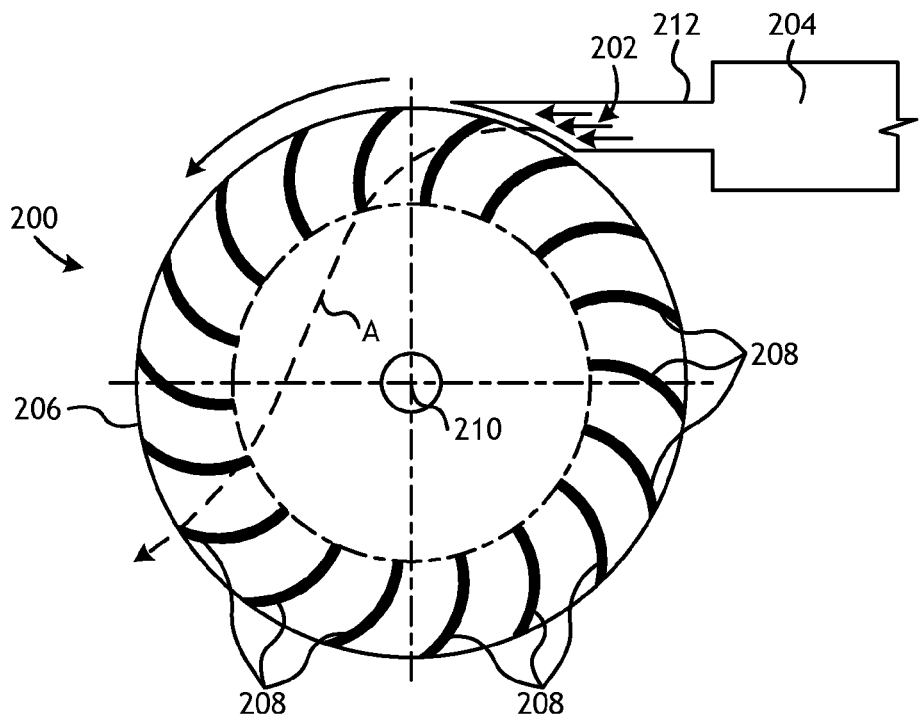
FIG. 2 is a schematic diagram of an exemplary transverse flow turbine assembly.

FIG. 2 depicts a schematic diagram of an exemplary transverse flow turbine assembly 200 that may be used in accordance with the principles of the present disclosure. The transverse flow turbine assembly 200 may be configured to receive a flow of a fluid 202 from a flow path 204 and convert the kinetic energy and potential energy of the fluid 202 into rotational energy that generates electrical power. The fluid 202 may be any of the fluids 120, 122 described above with reference to FIG. 1. Moreover, as used herein, the term "flow path" refers to a route through which the fluid 202 fluid is capable of being transported between at least two points. In some cases, the flow path 204 need not be continuous or otherwise contiguous between the two points.

Exemplary flow paths 204 include, but are not limited to, a flow line, a conduit, a pipeline, production tubing, drill string, work string, casing, a wellbore, an annulus defined between a wellbore and any tubular arranged within the wellbore, an annulus defined between a sand screen and a base pipe, any combination thereof, and the like. In FIG. 2, the flow path 204 may be any fluid route that delivers the fluid 202 to the transverse flow turbine assembly 200 for power generation.

The transverse flow turbine assembly 200 may include a transverse turbine 206 having a plurality of blades 208 disposed thereabout and configured to receive the fluid 202. As the fluid 202 impinges upon the blades 208, the transverse turbine 206 is urged to rotate about a rotational axis 210. Unlike conventional downhole power-generating turbines, which require axial fluid flow and otherwise fluid flow that is parallel to the rotational axis of the turbine, the fluid 202 in the transverse flow turbine assembly 200 is perpendicular to the rotational axis 210 of the transverse turbine 206. As a result, more power is generated at a given flow rate as compared to axial flow turbine assemblies. The transverse flow turbine assembly 200 can be configured to deliver more torque than an axial flow turbine and thus is more tolerant of debris as well as better suited to a flowing condition that is characterized by higher pressure drops and lower flow rates.

In some embodiments, before impinging upon the blades 208 of the transverse turbine 206, the fluid 202 may pass through a nozzle 212 fluidly coupled to the flow path 204 and otherwise arranged within the flow path 204 upstream from the transverse turbine 206. The nozzle 212 may be used to increase the kinetic energy of the fluid 202, which results in an increased power output from the transverse flow turbine assembly 200. The transverse turbine 206 may receive the fluid 202 transversely (i.e., across) the blades 208, and the fluid 202 may flow through the transverse turbine 206, as indicated by the dashed arrow A. As the fluid 202 flows through the transverse turbine 206, the blades 208 are urged to rotate the transverse turbine 206 about the rotational axis 210 and thereby generate electricity in an associated power generator (not shown).

The transverse turbine 206 of FIG. 2 is depicted as a cross-flow turbine but, as discussed below, the transverse turbine 206 may be any other type of turbine that receives a flow of fluid perpendicular to its rotational axis.

Figure 3:
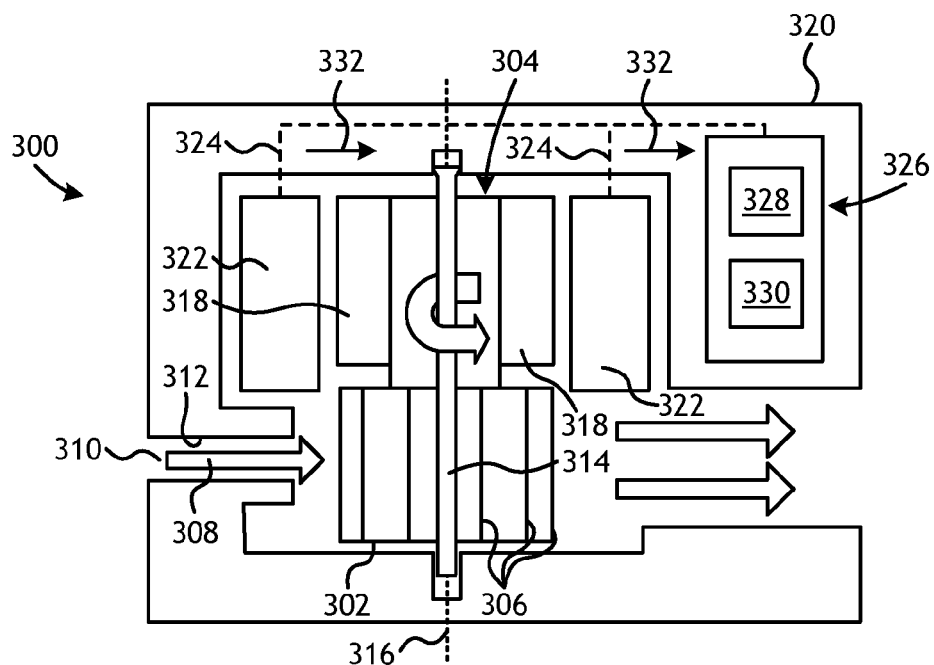
FIG. 3 is a schematic diagram of another exemplary transverse flow turbine assembly.

FIG. 3 depicts a schematic diagram of another exemplary transverse flow turbine assembly 300 that may be used in accordance with the principles of the present disclosure. The transverse flow turbine assembly 300 is includes a transverse turbine 302 operatively coupled to a power generator 304. The transverse turbine 302 of FIG. 3 is depicted as a water wheel-type turbine. The transverse turbine 302 may include a plurality of blades 306 disposed thereabout and configured to receive a flow of a fluid 308 from a flow path 310 and convert the kinetic energy of the fluid 308 into rotational energy that generates electrical power. Similar to the fluid 202 of FIG. 2, the fluid 308 may be any of the fluids 120, 122 described above with reference to FIG. 1. The flow path 310 may include or otherwise be fluidly coupled to a nozzle 312 that increases the kinetic energy of the fluid 308 before impinging upon the blades 306 of the transverse turbine 302, and thereby increasing the power output from the transverse flow turbine assembly 300.

The transverse turbine 302 may be operatively coupled to a rotor 314 that rotates about a rotational axis 316. The rotor 314 may extend into the generator 304 and may include a plurality of magnets 318 disposed or otherwise positioned thereon for rotation therewith. The generator 304 may further include a stator 320 and one or more magnetic pickups or coil windings 322 positioned on the stator 320. One or more electrical leads 324 may extend from the coil windings 322 to a power conditioning unit 326, which may include a power storage device 328 and a rectifier circuit 330 that operate to store and deliver a steady power supply for use by a load, such as a downhole tool, component, or device. Alternatively, the leads 324 may extend directly to one or more loads to provide electrical power directly thereto.

In the illustrated embodiment, the generator 304 is placed in the fluid 308 and otherwise is exposed to the fluid 308. The coil windings 322 and the leads 324 may be encapsulated or sealed with a magnetically-permeable material, such as a polymer, a metal, ceramic, an elastomer, or an epoxy, to protect the coil windings 322 and the leads 324 from potential fluid contamination, which could otherwise lead to corrosion or degradation of those components. As will be appreciated, placing the generator 304 in the fluid 308 eliminates the need for a dynamic seal around the rotor 314, which could eventually wear out, or the need for magnetic couplers, which may introduce durability issues over extended operation of the generator 304. In other embodiments, however, a dynamic seal could be employed, without departing from the scope of the disclosure.

In exemplary operation, the transverse turbine 302 may receive the fluid 308 transversely (i.e., across) the blades 306, and the fluid 308 may flow through the transverse turbine 302. As the fluid 308 impinges upon the blades 306, the transverse turbine 302 is urged to rotate about the rotational axis 316, thereby correspondingly rotating the magnets 318 as positioned on the rotor 314. The coil windings 322 may be configured to convert the rotational motion of the rotor 314 into electric energy in the form of current 332. More particularly, a magnetic field is generated by the rotational action of the rotor 314, which induces the current 332 in the coil windings 322. In some embodiments, a magnetic torque coupler (not shown) may be employed between the blades 306 and magnets 318 of the transverse turbine 302 and the coil windings 322 of the generator 304. The current 322 then traverses the leads 324 extending to the power conditioning unit 326 for storage and rectification. The power conditioning unit 326 may store and deliver a steady power supply for consumption by a load, such as a downhole sensor, telemetry device, choke, a digital processing circuit, and/or valve associated with the well system 100 of FIG. 1. Many forms of suitable power storage devices 328 are envisioned including batteries, a capacitive bank, or fuel cells, as examples.

As will be appreciated by those skilled in the art, there are several types of generators 304 that may be suitable for the embodiments described herein. In some embodiments, for example, the generator 304 may comprise a permanent magnet alternating current (AC) generator that uses pairs of magnets 318 with alternating poles that rotate relative to the coil windings 322 to generate an AC signal. There are multiple generator topologies that can be used depending on the packaging limitations of the application, and different topologies may vary the configuration of the stator 320, the coil windings 322, and the permanent magnets 318 depending on the available space and manufacturing limitations. Exemplary topologies include, but are not limited to, transverse flux, radial flux, and axial flux configurations.

In other embodiments, the generator 304 may comprise a direct current (DC) generator, such as a dynamo. In such embodiments, the generator 304 may use mechanical commutation to generate DC power. The magnetic field can be generated using permanent magnets or field coils, which may be self-excited or externally excited. In yet other embodiments, the generator 304 may comprise an alternator, which may be similar to the permanent magnet AC generator, but requires an excitation voltage for the coil windings 322 in the place of the permanent magnets 318. Moreover, the generator 304 may be either a brushless generator or a brushed generator, without departing from the scope of the disclosure.

Figure 4:
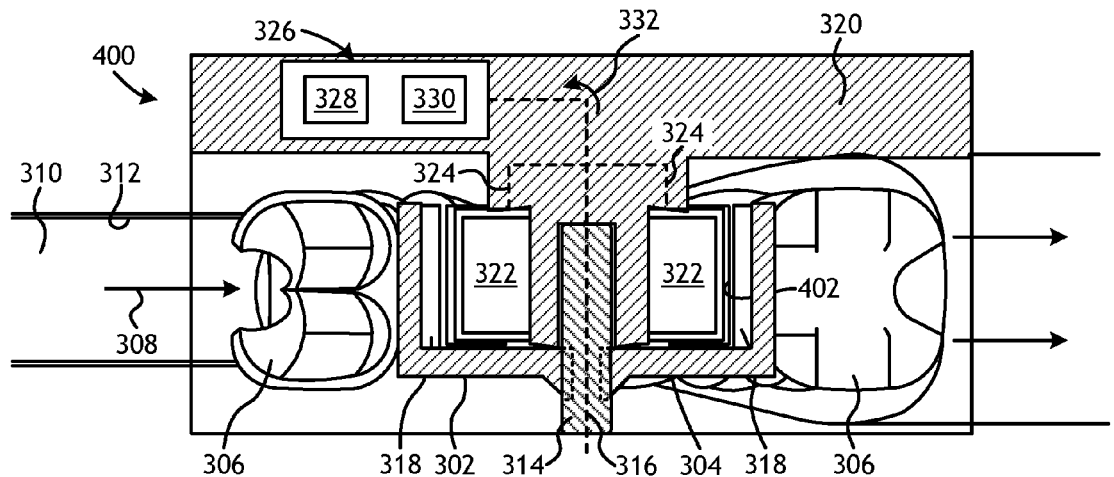
FIG. 4 is a schematic diagram of another exemplary transverse flow turbine assembly.

FIG. 4 depicts a schematic diagram of another exemplary transverse flow turbine assembly 400 that may be used in accordance with the principles of the present disclosure. The transverse flow turbine assembly 400 may be similar in some respects to the transverse flow turbine assembly 300 of FIG. 3 and therefore will be best understood with reference thereto, where like numerals indicate like components or elements not described again. Similar to the transverse turbine assembly 300, the transverse turbine assembly 400 may include the transverse turbine 302, the generator 304, and the blades 306 disposed about the transverse turbine 302 and configured to receive the fluid 308 from the flow path 310 to and convert the kinetic energy of the fluid 308 into rotational energy that generates electrical power in the generator 304. The nozzle 312 may be positioned within the flow path 310 increase the kinetic energy of the fluid 308 before impinging upon the blades 306 of the transverse turbine 302.

Unlike the transverse turbine assembly 300 of FIG. 3, however, the transverse turbine 302 of the transverse turbine assembly 400 may be characterized as a Pelton wheel or a Turgo turbine. Moreover, unlike the transverse turbine assembly 300, the generator 304 of the transverse turbine assembly 400 may be generally positioned within the transverse turbine 302, which reduces the axial height of the transverse turbine assembly 400. More specifically, as illustrated, the transverse turbine 302 may be coupled to the rotor 314 to rotate about the rotational axis 316, and the plurality of magnets 318 may be disposed or otherwise positioned on the transverse turbine 302 for rotation therewith. The stator 320 may extend at least partially into a hub 402 defined by the transverse turbine 302 and the magnetic pickups or coil windings 322 may be positioned within the hub 402 to interact with the magnets 318. As will be appreciated, this embodiment allows the generator 304 to have a very short axial length as compared to the generator 304 of FIG. 3.

Operation of the transverse turbine assembly 400 may be substantially similar to operation of the transverse turbine assembly 300 of FIG. 3 and therefore will not be described again. The current 332 generated by the rotational motion of the rotor 314 and the interaction of the magnets 318 and the coil windings 322 may be conveyed to the power conditioning unit 326 for storage and rectification. Alternatively, the current 332 may be provided directly to one or more loads, such as a downhole sensor, a telemetry device, a digital processing circuit, a choke, and/or a valve associated with the well system 100 of FIG. 1. As with the transverse turbine assembly 300 of FIG. 3, the generator 304 of the transverse turbine assembly 400 may be placed in the fluid 308 and may otherwise be exposed to the fluid 308. The coil windings 322 and the leads 324 may be encapsulated or sealed with a magnetically-permeable material to protect the coil windings 322 and the leads 324 from potential fluid contamination or corrosion.

Figure 5:
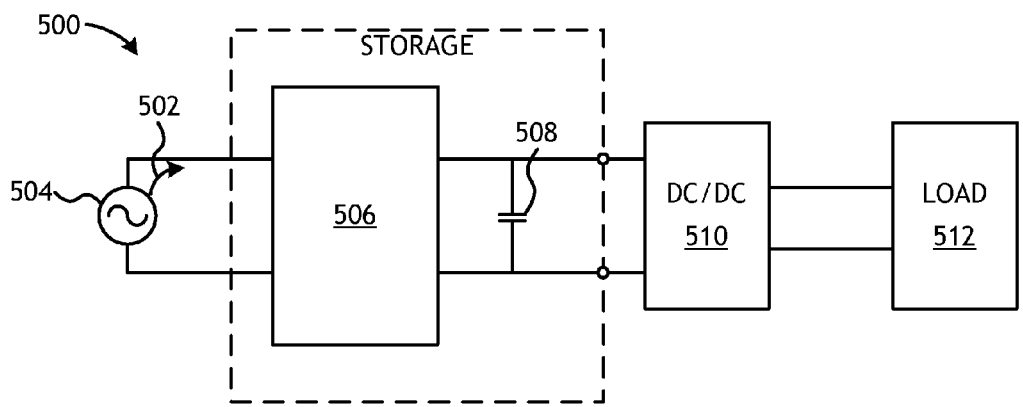
FIG. 5 is a circuit diagram of an exemplary power generating system 500, according to embodiments of the present disclosure.

FIG. 5 is a circuit diagram of an exemplary power generator 500, according to embodiments of the present disclosure. The generator 500 may be the same or similar to the generator 304 of FIGS. 3 and 4. As illustrated, current 502 may be generated by a source 504 coupled to a rectifier circuit 506. The source 504 may be the interaction of the magnets 318 and the coil windings 322, as described above in FIGS. 3 and 4. The rectifier circuit 506 provides an interface between a filter capacitor 508 and the source 504 and may be used to rectify the energy stored in the power storage device 508. Although the filter capacitor 508 is shown as a capacitor, other forms of storing a charge may be used, such as a battery or a fuel cell. The filter capacitor 508 may be configured to smooth the waveform, and the regulator 510 scales the voltage using a DC-to-DC converter and is therefore capable of delivering a steady amount of power to a load 512. As mentioned above, the load 512 may be any of a variety of downhole tools, components, or devices, such as, but not limited to, one or more downhole sensors, telemetry devices, digital processing circuits, chokes, and valves used in the well system 100 of FIG. 1.

Figure 6:
FIG. 6 is a schematic diagram of an exemplary transverse turbine that may be used in accordance with the present disclosure.

FIG. 6 is a schematic diagram of another exemplary transverse turbine 600 that may be used in accordance with the scope of the disclosure. As illustrated, the transverse turbine 600 may be a Turgo turbine, which is another type of transverse flow turbine. The transverse turbine 600 may replace any of the turbines 206, 304 described herein, without departing from the scope of the disclosure. Indeed, any type or configuration of turbine that is configured to receive fluid flow perpendicular to the rotational axis of the turbine may be suitable for use in any of the embodiments described herein. For instance, in other embodiments, a Francis or Jonval turbine may also be used, without departing from the scope of the disclosure.

Figure 7:
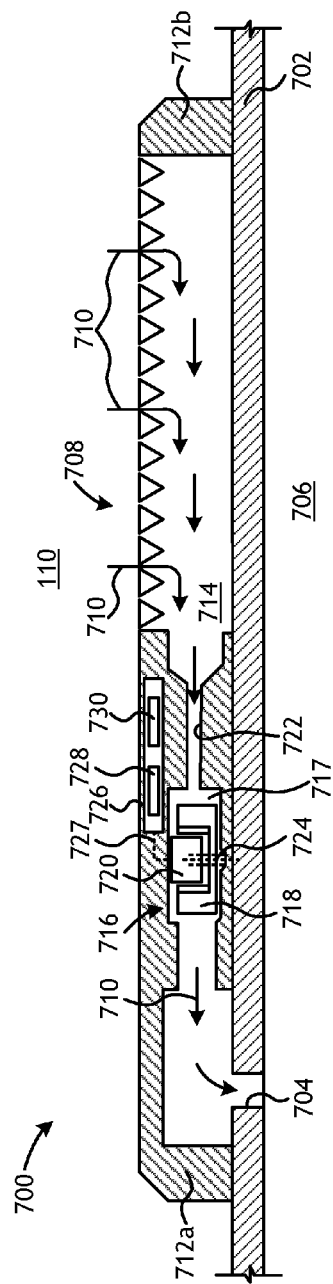
FIG. 7 is a cross-sectional view of an exemplary sand control screen assembly.

Referring now to FIG. 7, illustrated is a cross-sectional view of an exemplary sand control screen assembly 700, according to one or more embodiments. Along with the other screen assemblies described in greater detail below, the sand control screen assembly 700 may replace one or more of the screen assemblies 116 described in FIG. 1 and may otherwise be used in the well system 100 depicted therein. The sand control screen assembly 700 (hereafter "the assembly 700") may include or otherwise be arranged about a base pipe 702 that defines one or more openings or flow ports 704 configured to provide fluid communication between an interior 706 of the base pipe 702 and the surrounding subterranean formation 110. The base pipe 702 may be similar to or the same as the completion string 114 or the tubing string 112 of FIG. 1.

The assembly 700 may further include a sand screen 708 that is attached or otherwise coupled to the exterior of the base pipe 702. In operation, the sand screen 708 and its various components may serve as a filter medium designed to allow fluids 710 derived from the formation 110 to flow therethrough but substantially prevent the influx of particulate matter of a predetermined size. In at least one embodiment, the fluids 710 may be similar to the fluids 120 described above with reference to FIG. 1.

As illustrated, the sand screen 708 may extend between an upper end ring 712a arranged about the base pipe 702 at its uphole end and a lower end ring 712b arranged about the base pipe 702 at its downhole end. The upper end ring 712a and the lower end ring 712b provide a mechanical interface between the base pipe 702 and the opposing ends of the sand screen 708. In one or more embodiments, however, the lower end ring 712b may be omitted from the assembly 700 and the sand screen 708 may be coupled directly to the base pipe 702 at its downhole end. Each end ring 712a,b may be formed from a metal, such as 13 chrome, 304L stainless steel, 316L stainless steel, 420 stainless steel, 410 stainless steel, INCOLOY® 825, iron, brass, copper, bronze, tungsten, titanium, cobalt, nickel, combinations thereof, or the like. Moreover, each end ring 712a,b may be coupled or otherwise attached to the outer surface of base pipe 702 by being welded, brazed, threaded, mechanically fastened, combinations thereof, or the like. In other embodiments, however, one or both of the end rings 712a,b may be an integral part of the sand screen 708, and not a separate component thereof.

The sand screen 708 may be fluid-porous, particulate restricting device made from of a plurality of layers of a wire mesh that are diffusion bonded or sintered together to form a fluid-porous wire mesh screen. In other embodiments, however, the sand screen 708 may have multiple layers of a weave mesh wire material having a uniform pore structure and a controlled pore size that is determined based upon the properties of the formation 110. For example, suitable weave mesh screens may include, but are not limited to, a plain Dutch weave, a twilled Dutch weave, a reverse Dutch weave, combinations thereof, or the like. In other embodiments, however, the sand screen 708 may include a single layer of wire mesh, multiple layers of wire mesh that are not bonded together, a single layer of wire wrap, multiple layers of wire wrap or the like, that may or may not operate with a drainage layer. Those skilled in the art will readily recognize that several other mesh designs are equally suitable, without departing from the scope of the disclosure.

As illustrated, the sand screen 708 may be radially offset a short distance from the base pipe 702 so that a flow path 714 for the fluids 710 may be provided within the annulus defined between the sand screen 708 and the base pipe 702. More specifically, the flow path 714 may extend from the subterranean formation 110, through the sand screens 708, through the flow ports 704, and into the interior 706 of the base pipe 702. In other embodiments, the flow path 714 may include any portion of the aforementioned pathway.

The assembly 700 may further include a transverse flow turbine assembly 716 positioned within the flow path 714 and otherwise configured to transversely receive a flow of the fluid 710. In some embodiments, the transverse flow turbine assembly 716 may be positioned within a cavity 717 defined in the upper end ring 712a. Accordingly, the upper end ring 712a may be alternatively characterized as a turbine housing that houses the transverse flow turbine assembly 716. In other embodiments, the cavity 717 may be defined in a sub operatively coupled to the upper end ring 712a. The transverse flow turbine assembly 716 may be similar to any of the transverse flow turbine assemblies 200, 300, 400 described herein and may, therefore, include a transverse turbine 718 and a power generator 720. Accordingly, the transverse turbine 718 may be any of the transverse turbines described or mentioned herein or any other type of transverse turbine. The transverse turbine 718 may include a plurality of blades (not labeled) configured to receive the fluid 710 from the flow path 714 to and convert the kinetic energy of the fluid 710 into rotational energy that generates electrical power in the generator 720. As illustrated, the flow path 714 may include a nozzle 722 in fluid communication with the cavity 717. The nozzle 714 may be configured to increase the kinetic energy of the fluid 710 before the fluid 710 impinges upon the blades of the transverse turbine 718. In some embodiments, the nozzle 722 may form part of the upper end ring 712a. In other embodiments, however, the nozzle 722 may be included in a separate sub coupled to the upper end ring 712a.

In exemplary operation, the fluid 710 may be drawn into the flow path 714 from the surrounding formation 110, through the sand screen 708, and conveyed into the nozzle 722. The nozzle 722 may eject the fluid 710 into the cavity 717 to be received by the transverse turbine 718. The transverse turbine 718 may receive the fluid 710 transversely (i.e., across) the blades, and the fluid 710 may thereafter flow through the transverse turbine 718. As the fluid 710 impinges upon the blades, the transverse turbine 718 is urged to rotate about a rotational axis 724 that is perpendicular to the flow of the fluid 710. Rotating the transverse turbine 718 may allow the generator 720 to generate a current that may be provided to an adjacent power conditioning unit 726 for storage and rectification via one or more electrical leads 727. The power conditioning unit 726 may be similar to or the same as the power conditioning unit 326 of FIGS. 3 and 4 and, therefore, may include a power storage device 728 and a rectifier circuit 730 used to store and deliver a steady power supply for use by a load (not shown), such as a downhole sensor, telemetry device, a digital processing circuit, choke, and/or valve associated with the assembly 700. After passing out of the transverse flow turbine assembly 716, the fluid 710 may continue within the flow path 714 until entering the interior 706 of the base pipe 702 via the flow ports 704.

As will be appreciated, while FIG. 7 depicts the fluid 710 flowing within the flow path 714 from the formation 110 to the interior 706 of the base pipe 702 to generate electricity using the transverse flow turbine assembly 716, fluids may alternatively flow in the opposite direction in the flow path 714 and equally generate electricity. More particularly, in an injection operation, a fluid (e.g., the fluid 122 of FIG. 1) may be conveyed to the assembly 700 within the interior 706 of the base pipe 702 and into the flow path 714 from the flow ports 704. From the flow ports 704, the fluid may traverse the transverse flow turbine assembly 716 and the sand screens 708 to be injected into the surrounding formation 110. As the fluids pass through the transverse flow turbine assembly 716, electricity may be generated at the generator 720, as generally described above. In such embodiments, the position of the nozzle 722 within the flow path 714 may be moved such that it is placed uphole from the transverse flow turbine assembly 716 and thereby able to increase the kinetic energy of the injection fluids prior to impinging upon the transverse turbine 718.

In FIG. 7, the rotational axis 724 of the transverse turbine 718 is extending substantially in the radial direction with respect to the base pipe 702. In other embodiments, however, the rotational axis 724 may alternatively extend in an axial direction with respect to the base pipe 702, without departing from the scope of the disclosure. In such embodiments, the flow path 714 may be re-routed such that the fluid 710 continues to impinge on the blades of the transverse turbine 718 transversely and otherwise perpendicular to the rotational axis 724.

Figure 8:
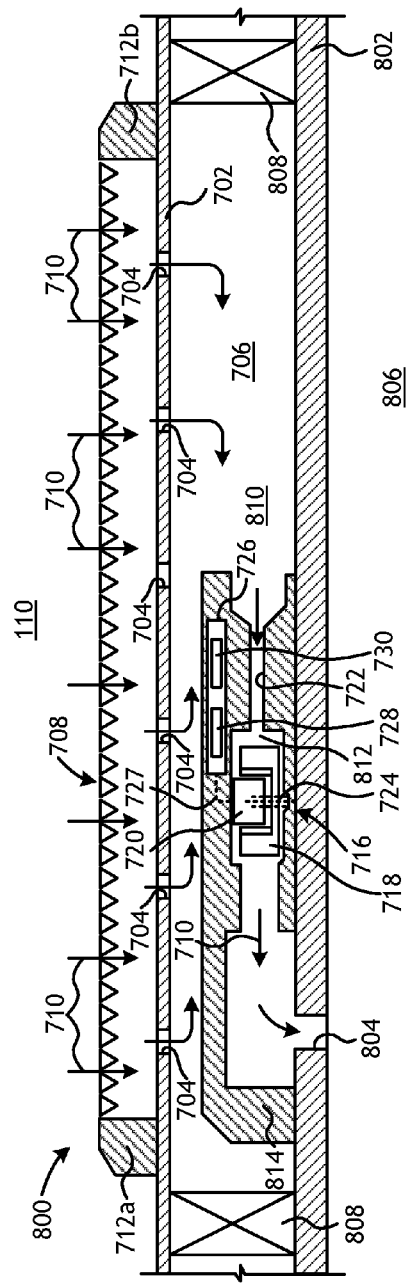
FIG. 8 is a cross-sectional view of another exemplary sand control screen assembly.

FIG. 8 depicts a cross-sectional view of another exemplary sand control screen assembly 800, according to one or more embodiments. The sand control screen assembly 800 (hereafter "the assembly 800") may be similar in some respects to the assembly 700 of FIG. 7 and therefore may be best understood with reference thereto, where like numerals represent like elements not described again in detail. Similar to the assembly 700 of FIG. 7, the assembly 800 may include the base pipe 702 having the openings or flow ports 704 defined therein to provide fluid communication between the interior 706 of the base pipe 702 and the surrounding subterranean formation 110. The assembly 800 may further include the sand screen 708 attached or otherwise coupled to the exterior of the base pipe 702 using one or both of the upper and lower end rings 712a,b.

As illustrated, a production tubing 802 may be arranged within the assembly 800. In some embodiments, the production tubing 802 may be coupled to the distal end of the tubing string 112 of FIG. 1 and stung or otherwise inserted into the interior 706 of the base pipe 702 (e.g., the completion string 114 of FIG. 1). The production tubing 802 may define one or more production ports 804 that facilitate fluid communication between the interior 706 of the base pipe 702 and an interior 806 of the production tubing 802, and thereby placing the formation 110 in fluid communication with the interior 806 of the production tubing 802. Production seals 808 may be disposed between the production tubing 802 and the base pipe 702, thereby defining a production interval therebetween. As a result, the base pipe 702 may be radially offset a short distance from the production tubing 802 to define a flow path 810 for the fluids 710 to communicate with the interior 806 of the production tubing 802. The flow path 810 may extend from the subterranean formation 110, through the sand screens 708, through the flow ports 704 and into the interior 706 of the base pipe 702, through the production ports 804, and into the interior 806 of the production tubing 802. In other embodiments, the flow path 810 may include any portion or section of the aforementioned fluid pathway.

The transverse flow turbine assembly 716 may be positioned on the production tubing 802 within the flow path 810 and otherwise configured to receive a flow of the fluid 710 from the formation 110. The transverse flow turbine assembly 716 may be positioned within a cavity 812 defined in a turbine housing 814 operatively coupled to the production tubing 802. The nozzle 722 may be positioned within the flow path 810 and defined by or otherwise within the turbine housing 814.

In exemplary operation, the fluid 710 may be drawn into the flow path 810 from the surrounding formation 110 and conveyed into the nozzle 722 after passing through the flow ports 704 of the base pipe 702. The production seals 808 prevent the fluid 710 from migrating in either axial direction along the exterior of the production tubing 802. The nozzle 722 may eject the fluid 710 toward the transverse turbine 718 to be received transversely (i.e., across) the blades (not labeled). As the fluid 710 impinges upon the blades, the transverse turbine 718 is urged to rotate about the rotational axis 724 that is perpendicular to the flow of the fluid 710, and thereby generates electricity in the generator 720. After passing out of the transverse flow turbine assembly 716, the fluid 710 may continue within the flow path 810 until entering the interior 806 of the production tubing 802 via the production ports 804.

As will be appreciated, while FIG. 8 depicts the fluid 710 flowing within the flow path 810 from the formation 110 to the interior 806 of the production tubing 802 to generate electricity using the transverse flow turbine assembly 716, fluids may alternatively flow in the opposite direction in the flow path 810 and equally generate electricity. More particularly, in an injection operation, fluids (i.e., the fluid 122 of FIG. 1) may be conveyed to the assembly 800 within the interior 806 of the production tubing 802 and into the flow path 810 from the production ports 804. From the production ports 804, the fluid may traverse the transverse flow turbine assembly 716 and subsequently flow through the flow ports 704 and the sand screens 708 to be injected into the surrounding formation 110. As the fluids pass through the transverse flow turbine assembly 716, electricity may be generated at the generator 720, as generally described above. In such embodiments, the position of the nozzle 722 may be moved such that it is placed uphole from the transverse flow turbine assembly 716 and thereby able to increase the kinetic energy of the injection fluids prior to impinging upon the transverse turbine 718.

In some embodiments, the electricity or power generated by the embodiments described herein may be used to control a valve that controls a hydraulic circuit associated with a much larger valve. For example, the power generated by the transverse turbines and the transverse flow turbine assemblies may be conveyed to a valve that controls hydraulic flow that operates a larger valve for purposes of controlling flow from or to lateral wells.

Embodiments disclosed herein include:

A. A well system that includes a base pipe having an interior and defining one or more flow ports, the base pipe being positionable within a wellbore adjacent a subterranean formation, a flow path for a fluid, the flow path extending between the interior of the base pipe, through the one or more flow ports, and an exterior of the base pipe, a transverse turbine positioned in the flow path, the transverse turbine including a rotor and a plurality of blades positioned to receive a flow of the fluid perpendicular to a rotational axis of the rotor, and a generator including one or more magnets rotatable with rotation of the transverse turbine and one or more coil windings mounted on a stator, wherein the flow of the fluid rotates the transverse turbine and rotation of the transverse turbine generates electrical power in the generator.

B. A method that includes positioning a base pipe within a wellbore adjacent a subterranean formation, the base pipe providing an interior and defining one or more flow ports that facilitate fluid communication between the interior and an exterior of the base pipe, flowing a fluid within a flow path that extends between the interior of the base pipe, through the one or more flow ports, and to the exterior of the base pipe, receiving a flow of the fluid with a transverse turbine positioned in the flow path, the transverse turbine including a rotor and a plurality of blades, receiving the flow of the fluid with the plurality of blades, the flow of the fluid being perpendicular to a rotational axis of the rotor, and rotating the transverse turbine in response to receiving the flow of the fluid, generating electrical power with a generator including one or more magnets rotatable with rotation of the transverse turbine and one or more coil windings mounted on a stator.

Each of embodiments A and B may have one or more of the following additional elements in any combination: Element 1: wherein the fluid is selected from the group consisting of oil, water, gas, steam, an aqueous or liquid chemical, a gravel slurry, an acid, carbon dioxide, cement, any derivative thereof, and any combination thereof. Element 2: further comprising a nozzle positioned in the flow path upstream from the transverse turbine. Element 3: wherein the one or more magnets are positioned on at least one of the transverse turbine and the rotor. Element 4: wherein the generator further comprises one or more electrical leads extending from the one or more coil windings to convey the electrical power, and a power conditioning unit communicably coupled to the one or more coil windings to receive the electrical power via the one or more electrical leads, the power conditioning unit providing a power supply to one or more loads used in a downhole environment. Element 5: wherein the generator further comprises one or more electrical leads that extend to provide the electrical power directly to one or more loads. Element 6: wherein the one or more loads are selected from the group consisting of a downhole sensor, a telemetry device, a digital processing circuit, an actuatable choke, and an actuatable valve. Element 7: wherein the generator is selected from the group consisting of a permanent magnet alternating current generator, a direct current generator, and an alternator. Element 8: wherein the transverse turbine is selected from the group consisting of a cross-flow turbine, a water wheel turbine, a Pelton wheel turbine, a Turgo turbine, a Francis turbine and a Jonval turbine. Element 9: further comprising a sand screen arranged about the base pipe, the flow path further extending through the sand screen. Element 10: wherein the base pipe is production tubing and the well system further comprises a completion string positioned within the wellbore adjacent the subterranean formation and defining one or more completion string flow ports, wherein the production tubing is disposed within the completion string, and a sand screen arranged about the completion string, the flow path further extending through the sand screen and through the one or more completion string flow ports.

Element 11: wherein flowing the fluid within the flow path comprises flowing the fluid from the interior of the base pipe, through the transverse turbine, and to the exterior of the base pipe. Element 12: wherein flowing the fluid within the flow path comprises flowing the fluid from the exterior of the base pipe, through the transverse turbine, and to the interior of the base pipe. Element 13: further comprising increasing a kinetic energy of the flow of the fluid with a nozzle positioned in the flow path upstream from the transverse turbine. Element 14: conveying the electrical power to a power conditioning unit with one or more electrical leads extending from the one or more coil windings, and providing a power supply to one or more loads used in a downhole environment with the power conditioning unit, wherein the one or more loads are selected from the group consisting of a downhole sensor, a telemetry device, a digital processing circuit, an actuatable choke, and an actuatable valve. Element 15: further comprising conveying the electrical power to one or more loads with one or more electrical leads extending from the one or more coil windings, the one or more loads being selected from the group consisting of a downhole sensor, a telemetry device, a digital processing circuit, an actuatable choke, and an actuatable valve. Element 16: wherein a sand screen is arranged about the base pipe and wherein flowing the fluid within the flow path further comprises flowing the fluid through the sand screen. Element 17: wherein the base pipe is production tubing disposed within a completion string positioned within the wellbore adjacent the subterranean formation, the completion string defining one or more completion string flow ports and having a sand screen arranged thereabout, wherein flowing the fluid within the flow path further comprises flowing the fluid through the sand screen and through the one or more completion string flow ports. Element 18: wherein the fluid is selected from the group consisting of oil, water, gas, steam, an aqueous or liquid chemical, a gravel slurry, an acid, carbon dioxide, a cement, any derivative thereof, and any combination thereof.

By way of non-limiting example, exemplary combinations applicable to A, B, C include: Element 3 with Element 4; Element 5 and Element 6; Element 9 with Element 10; Element 11 and Element 13; and Element 12 and Element 13.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A well system, comprising:
   a base pipe having an interior, an exterior, and one or more flow ports defined through the base pipe to facilitate fluid communication between the interior and the exterior, the base pipe being positionable within a wellbore adjacent a subterranean formation;
   a turbine housing operatively coupled to the base pipe and at least partially defining a flow path for a fluid that extends between the interior and the exterior of the base pipe and through the turbine housing;
   a transverse turbine positioned in the turbine housing and arranged in the flow path, the transverse turbine including a rotor and a plurality of blades positioned to receive a flow of the fluid that is against the rotor and perpendicular to a rotational axis of the rotor, wherein the turbine housing has an inlet and an outlet across the rotational axis and on opposite sides of the transverse turbine; and
   a generator including one or more magnets rotatable with rotation of the transverse turbine and one or more coil windings mounted on a stator, wherein the flow of the fluid rotates the transverse turbine and rotation of the transverse turbine generates electrical power in the generator.

2. The well system of claim 1, wherein the fluid is selected from the group consisting of oil, water, gas, steam, an aqueous or liquid chemical, a gravel slurry, an acid, carbon dioxide, cement, any derivative thereof, and any combination thereof.

3. The well system of claim 1, further comprising a nozzle positioned in the flow path upstream from the transverse turbine.

4. The well system of claim 1, wherein the one or more magnets are positioned on at least one of the transverse turbine and the rotor.

5. The well system of claim 1, wherein the generator further comprises:
one or more electrical leads extending from the one or more coil windings to convey the electrical power; and
a power conditioning unit communicably coupled to the one or more coil windings to receive the electrical power via the one or more electrical leads, the power conditioning unit providing a power supply to one or more loads used in a downhole environment.

6. The well system of claim 5, wherein the one or more loads are selected from the group consisting of a downhole sensor, a telemetry device, a digital processing circuit, an actuatable choke, and an actuatable valve.

7. The well system of claim 1, wherein the generator further comprises one or more electrical leads that extend to provide the electrical power directly to one or more loads.

8. The well system of claim 1, wherein the generator is selected from the group consisting of a permanent magnet alternating current generator, a direct current generator, and an alternator.

9. The well system of claim 1, wherein the transverse turbine is selected from the group consisting of a cross-flow turbine, a water wheel turbine, a Pelton wheel turbine, a Turgo turbine, a Francis turbine and a Jonval turbine.

10. The well system of claim 1, further comprising a sand screen arranged about the base pipe, the flow path further extending through the sand screen.

11. The well system of claim 1, wherein the base pipe is production tubing and the well system further comprises:
a completion string positioned within the wellbore adjacent the subterranean formation and defining one or more completion string flow ports, wherein the production tubing is disposed within the completion string; and
a sand screen arranged about the completion string, the flow path further extending through the sand screen and through the one or more completion string flow ports.

12. A method, comprising:
positioning a base pipe within a wellbore adjacent a subterranean formation, the base pipe having an interior, an exterior, and one or more flow ports defined through the base pipe to facilitate fluid communication between the interior and the exterior;
flowing a fluid through a flow path at least partially defined by a turbine housing operatively coupled to the base pipe, the flow path extending between the interior and the exterior of the base pipe and through the turbine housing;
receiving a flow of the fluid with a transverse turbine positioned in the turbine housing and arranged in the flow path, the transverse turbine including a rotor and a plurality of blades;
receiving the flow of the fluid with the plurality of blades, the flow of the fluid being against the rotor and perpendicular to a rotational axis of the rotor, wherein the transverse turbine is positioned between an inlet and an outlet that are across the rotational axis and on opposite sides of the transverse turbine;
rotating the transverse turbine in response to receiving the flow of the fluid; and
generating electrical power with a generator including one or more magnets rotatable with rotation of the transverse turbine and one or more coil windings mounted on a stator.

13. The method of claim 12, wherein flowing the fluid within the flow path comprises flowing the fluid from the interior of the base pipe, through the transverse turbine, and to the exterior of the base pipe.

14. The method of claim 12, wherein flowing the fluid within the flow path comprises flowing the fluid from the exterior of the base pipe, through the transverse turbine, and to the interior of the base pipe.

15. The method of claim 12, further comprising increasing a kinetic energy of the flow of the fluid with a nozzle positioned in the flow path upstream from the transverse turbine.

16. The method of claim 12, further comprising:
conveying the electrical power to a power conditioning unit with one or more electrical leads extending from the one or more coil windings; and
providing a power supply to one or more loads used in a downhole environment with the power conditioning unit, wherein the one or more loads are selected from the group consisting of a downhole sensor, a telemetry device, a digital processing circuit, an actuatable choke, and an actuatable valve.

17. The method of claim 12, further comprising conveying the electrical power to one or more loads with one or more electrical leads extending from the one or more coil windings, the one or more loads being selected from the group consisting of a downhole sensor, a telemetry device, a digital processing circuit, an actuatable choke, and an actuatable valve.

18. The method of claim 12, wherein a sand screen is arranged about the base pipe and wherein flowing the fluid within the flow path further comprises flowing the fluid through the sand screen.

19. The method of claim 12, wherein the base pipe is production tubing disposed within a completion string positioned within the wellbore adjacent the subterranean formation, the completion string defining one or more completion string flow ports and having a sand screen arranged thereabout, wherein flowing the fluid within the flow path further comprises flowing the fluid through the sand screen and through the one or more completion string flow ports.

20. The method of claim 12, wherein the fluid is selected from the group consisting of oil, water, gas, steam, an aqueous or liquid chemical, a gravel slurry, an acid, carbon dioxide, a cement, any derivative thereof, and any combination thereof.

* * * * *